(12) United States Patent
Lea et al.

(10) Patent No.: US 7,620,581 B2
(45) Date of Patent: Nov. 17, 2009

(54) FINANCIAL INSTRUMENT PORTFOLIO CREDIT EXPOSURE EVALUATION

(75) Inventors: Nicholas John Lea, Oxfordshire (GB); Henrik Rasmussen, London (GB)

(73) Assignee: SunGard Systems International Inc., London (GB)

( * ) Notice: Subject to any disclaimer, the term of this patent is extended or adjusted under 35 U.S.C. 154(b) by 660 days.

(21) Appl. No.: 10/492,903

(22) PCT Filed: Oct. 16, 2001

(86) PCT No.: PCT/GB01/04605

§ 371 (c)(1),
(2), (4) Date: Mar. 30, 2005

(87) PCT Pub. No.: WO03/036533

PCT Pub. Date: May 1, 2003

(65) Prior Publication Data

US 2005/0209940 A1    Sep. 22, 2005

(51) Int. Cl.
*G06Q 40/00* (2006.01)
(52) U.S. Cl. .................................................. 705/36 R
(58) Field of Classification Search ................... 705/35, 705/36, 36 R, 37, 38
See application file for complete search history.

(56) References Cited

U.S. PATENT DOCUMENTS

| | | | | |
|---|---|---|---|---|
| 5,784,696 A | * | 7/1998 | Melnikoff | 705/36 R |
| 5,799,287 A | * | 8/1998 | Dembo | 705/36 R |
| 6,061,662 A | * | 5/2000 | Makivic | 705/36 R |
| 6,278,981 B1 | * | 8/2001 | Dembo et al. | 705/36 R |
| 7,171,385 B1 | * | 1/2007 | Dembo et al. | 705/36 R |
| 7,228,290 B2 | * | 6/2007 | Browne et al. | 705/36 R |
| 2002/0123951 A1 | * | 9/2002 | Olsen et al. | 705/36 |
| 2002/0147671 A1 | * | 10/2002 | Sloan et al. | 705/36 |
| 2003/0110112 A1 | * | 6/2003 | Johnson et al. | 705/36 |
| 2004/0205018 A1 | * | 10/2004 | Degraaf et al. | 705/37 |

OTHER PUBLICATIONS

"Sungard Trading and Risk Systems", Company Summary, http://www.rtg.online.com/company, Mar. 22, 2005, 10 pages.

* cited by examiner

*Primary Examiner*—Hani Kazimi
*Assistant Examiner*—Bijendra K Shrestha
(74) *Attorney, Agent, or Firm*—Woodcock Washburn LLP (57) ABSTRACT

A computer-implemented method evaluates credit exposure of a portfolio of financial instruments. A deal object is established for each instrument. The deal object comprises a representation of the instrument and a valuation function for representing how the value of the instrument is related to underlying market variables. Risk factor model are established with each model representing a market variable which may affect the value of the instruments. A deal parabolic function is established representing each deal object valuation function by operation of the deal object valuation function on each risk factor model to which it is sensitive. The coefficients of each deal parabolic function established at a same instant from the deal objects represented in the portfolio are summed in order to build a portfolio parabolic function approximating the overall portfolio value for that instant.

18 Claims, 3 Drawing Sheets

FINANCIAL INSTRUMENT PORTFOLIO CREDIT EXPOSURE EVALUATION

The present invention relates to a method for use in the evaluation of the credit exposure of a portfolio of financial instruments.

Financial instruments such as forwards, options and other derivatives can be highly complex, making an assessment of their future value over time a complicated and highly specialised area.

It will be appreciated that the value of such instruments at any one future point in time will depend not only on the "internal" nature of the instrument itself, but also on "external" market factors, such as for example future exchange rates, asset prices and interest rates.

The "credit exposure" of a portfolio of financial instruments is defined—for a future point in time—as the statistical upper-bound (usually 97.5% or 99%) of the possible values which might be attained by that portfolio at that future time. The construction of future values may also incorporate the effect of legal contracts which reduce credit exposure in the event of client default such as collateral agreements and close-out netting agreements.

A reliable estimate of credit exposure (statistical upper-bound of future value) for a portfolio of such financial instruments can be invaluable to a financial institution. In particular, a profile of credit exposure at many future points in time is often used when assessing whether to enter into a financial contract with a client. For example, a "Tier 1" bank, such as ABN-AMRO may be considering whether to trade a particular financial instrument with a client, say Shell. ABN-AMRO need to be sure however that the addition of that financial instrument to Shell's existing portfolio does not create inappropriate future credit exposures: (a) that Shell will be able to meet its worst case obligations on the portfolio and (b) that the level of credit exposure is proportional to the risk of Shell being put into receivership.

In this connection, mathematical systems are currently available for analysing a portfolio of financial instruments with a view to predicting, at a future point in time, the statistical upper-bound of the value of the portfolio. The statistical upper bound of the portfolio can be seen as the worst case scenario for what could be lost, i.e. the maximum that may be lost if the counterparty cannot cover that maximum value due to default.

One such method for assessing the statistical upper-bound utilises the Monte Carlo technique. The method requires that each financial instrument can be "valued" using a mathematical formula which gives the future value of the instrument from hypothetical future values of underlying market variables (asset prices, exchange rates, interest rates). The value of a portfolio at some arbitrary future date can hence be expressed as the combination of valuation functions of the constituent financial instruments. This results in a very large mathematical function, say $P(\ )$, which depends on a very large number of unknown market variables.

The Monte Carlo method establishes the upper-bound of portfolio value by generating future random values for all the variables that the portfolio depends upon and applying the portfolio valuation function, $P(\ )$, to those variables. If this is done often enough (10,000 is typical) then one can estimate the upper-bound at a given point in time by ordering the outcomes an picking the valuation that occurs at the appropriate rank.

In other words, at each designated point in time, the method will carry out thousands of calculations to evaluate all potential values of the portfolio at that point. The reliability of the estimate will increase for an increased number of calculations, but this can be prohibitive since the speed of securing a result is directly related to the number of calculations made. The Monte Carlo method is laborious and hence relatively slow.

Since the portfolio valuation function can be so complex, there is no guaranteed shortcut for carrying out all this multi-dimensional statistics without simulation.

An object of the present invention is therefore to seek to provide an evaluation method that alleviates such problems of existing methods.

According to a first aspect of the present invention there is provided a method for evaluating the credit exposure of a portfolio of one or more financial instruments, the method comprising:— establishing a deal object for the or each financial instrument, the deal object comprising a representation of said financial instrument and a valuation function for representing how the value of the financial instrument is related to underlying market variables.

establishing one or more risk factor models, the or each risk factor model representing an underlying financial market variable which may affect the value of one or more of said financial instruments;

establishing a deal parabolic function for representing the or each deal object valuation function, by operation of said the or each deal object valuation function on said the or each risk factor model to which it is sensitive, each deal parabolic function giving its value at a particular instant under a particular state of market risk factors;

summing the coefficients of each said deal parabolic function established at a same instant from the one or more deal objects represented in the portfolio in order to build a portfolio parabolic function which approximates the overall portfolio value for that instant;

wherein establishing each said deal parabolic function involves evaluating a plurality of coordinates calculated from said deal object valuation function and then applying a parabolic curve, surface or multi-dimensional surface (manifold) to fit said coordinates, the parabolic curve or surface then representing that deal object valuation function.

Preferably, three or more coordinates are calculated and plotted to which the parabolic curve or quadratic polynomial is to be applied.

The evaluation method of the present invention is not hence based around using random elements, but instead simplifies the problem of valuing complex functions so that an answer can be determined by linear algebra and established properties of quadratic forms.

In this regard, the evaluation method of the present invention involves the creation of a simplified approximation of each deal object valuation function, a hyper-dimensional surface or manifold. This manifold is preferably quadratic (in any one dimension only depends on three parameters).

In preferred embodiments, the or each deal object valuation function is established using a deal object, each deal object operating to select an appropriate skeleton or template representation from a store of such representations of financial instruments, and to populate the skeleton or template with data which will define the nature of the financial instrument.

Conveniently, the or each deal object further operates to identify to which risk factor models the valuation function of that deal object is sensitive.

Preferably, the or each deal object further operates to value the deal represented therein in relation to the risk factor models that have been identified as being appropriate to the valuation function of that deal object. For a single future point in time several valuations are performed corresponding to different state of the contingent risk factor models.

In preferred embodiments, the deal object operates to apply an "optimal fit" parabolic curve to the coordinates evaluated from the deal valuation function, the optimal fit curve being chosen on the basis that it most readily passes through the coordinates plotted with minimum deflection between coordinates. The exact position and number of the valuations conducted depends on the type of deal object. Where three points per risk factor are evaluated, an exact parabola fit can be established. Where more than three points per risk factor are evaluated the technique of quadratic least squares is employed to derive the parabola coefficients.

Preferably, the coordinates to which the parabola is to be applied are chosen from each of the limits of the deal object valuation function (defined by the extremes of the relevant risk factors) and at its central region.

Deal objects can be of various types depending on the type of financial instrument represented. For example a Foreign Exchange Option will be represented by an FXOptionDeal object. This object will have parameters which store all the details (terms & conditions) of that particular deal e.g whether it is a 'call' or 'put', whether it is bought or sold, the option strike amount, the underlying amount, the trade date, and the exercise date.

If a portfolio contains 1000 foreign exchange options then it will be represented by 1000 deal objects, all with different data fields, but with the same type. The structure of the data they hold and the code that is operable on them will be the same. But of course, portfolios are likely to contain many types of financial instrument. In the current system there are around 50 different types of deal objects. Templates or skeleton representations of such deal objects are stored in a suitable store.

Preferably, the or each risk factor model is established using a risk factor object, each risk factor object operating to select an appropriate skeleton or template representation from a store of such representations of risk factors and to populate the skeleton or template with data which will define the nature of the risk factor model.

The value of a deal at any point in time depends on certain market variables which are termed risk factors. For example the value of a GBP:USDOLLAR option deal is in essence determined by the behavior of (a) the GBP:USD exchange rate and (b) the USD interest rate (if we are valuing the option in USD). The option will only be affected by other market variables in as much as they affect these two "underlyings". The same is true of the portfolio as a whole. A counterparty portfolio might contain 1000 deals and its value dependent on 100 risk factors. Templates or skeleton representations for such risk factors are stored in a Risk Factor List.

Conveniently, the method further comprises compiling a database or store of financial and market data.

Preferably, the method comprises the use of techniques of linear algebra and quadratic forms to evaluate the statistical upper-bound of the parabolic function for the overall portfolio, and hence, an approximation for the credit exposure of the portfolio.

In preferred embodiments, said techniques comprise one or more of aggregation, decomposition of the covariance matrix, transformation onto orthogonal variables, the application of PCA (Principal Component Analysis) on weighted factors, the transforming away of cross terms, and the calculation of distribution moments and percentiles for the approximation.

According to a further aspect of the present invention there is provided a system for evaluating the exposure of a portfolio of one or more financial instruments, the system comprising:—
means for establishing a deal object for the or each financial instrument, the deal object comprising a representation of said financial instrument and a valuation function for representing how the value of the financial instrument is related to underlying market variables;
means for establishing one or more risk factor models, the or each risk factor model representing an underlying financial market risk factor which may affect the value of one or more of said deal objects;
means for establishing a deal parabolic function for each deal object, comprising means for operation of the deal object valuation function on said the or each risk factor model to which it is sensitive; and
means for summing each said deal parabolic function established at a same instant from the deal objects represented in the portfolio in order to build an overall portfolio value for that instant;
wherein said means for establishing each said deal parabolic function comprises means for making an approximation of said each deal object valuation function, involving the evaluation of a plurality of coordinates calculated from said deal object valuation function and then applying a parabolic curve, surface, hyper surface (manifold) to fit said coordinates, the parabolic curve or quadratic polynomial then representing that deal valuation function.

A system as defined above, wherein the system is a computer system.

The present invention encompasses a computer program comprising program instructions for carrying out the above method a computer program as defined above, the program being embodied on a record medium, computer memory, read-only memory, or electrical carrier signal.

Figure 1:
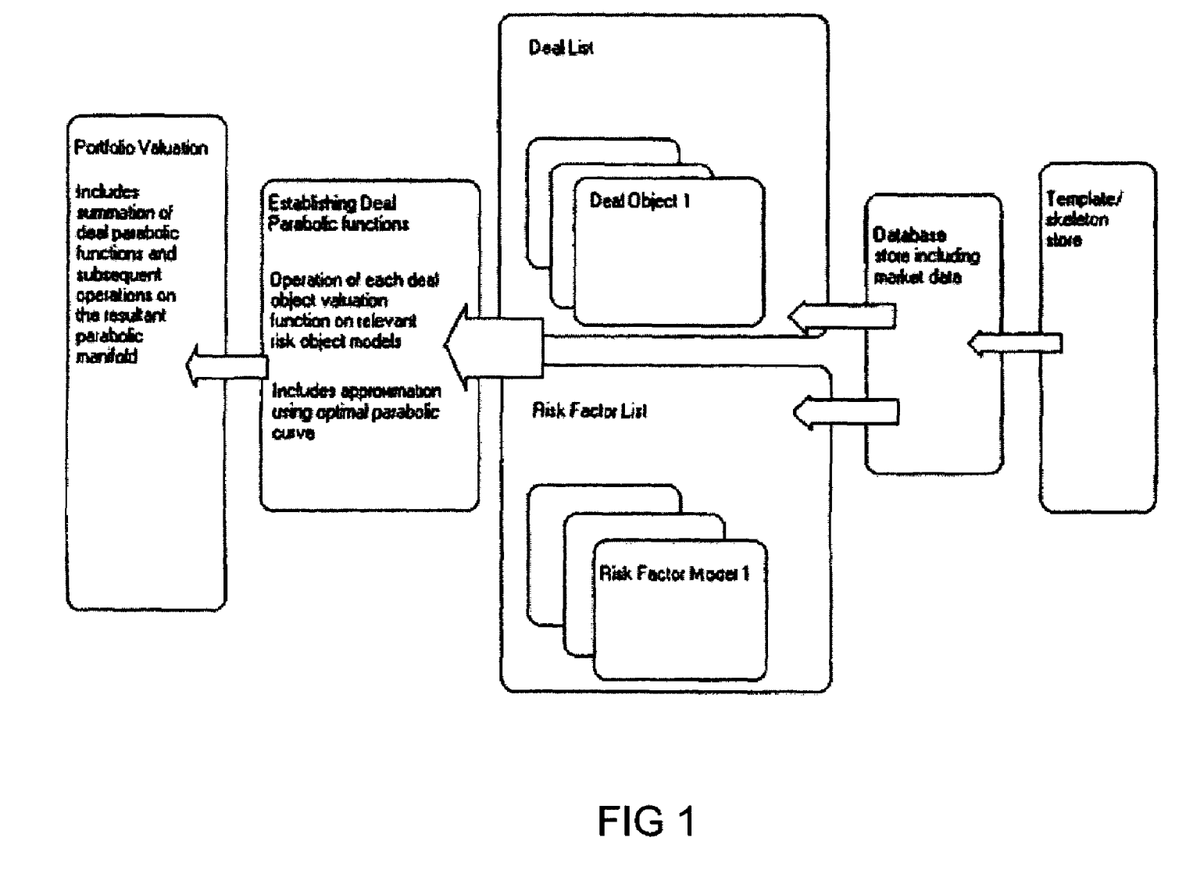
FIG. 1 is a diagram depicting a method in accordance with aspects of the disclosed embodiments.
Figure 2:
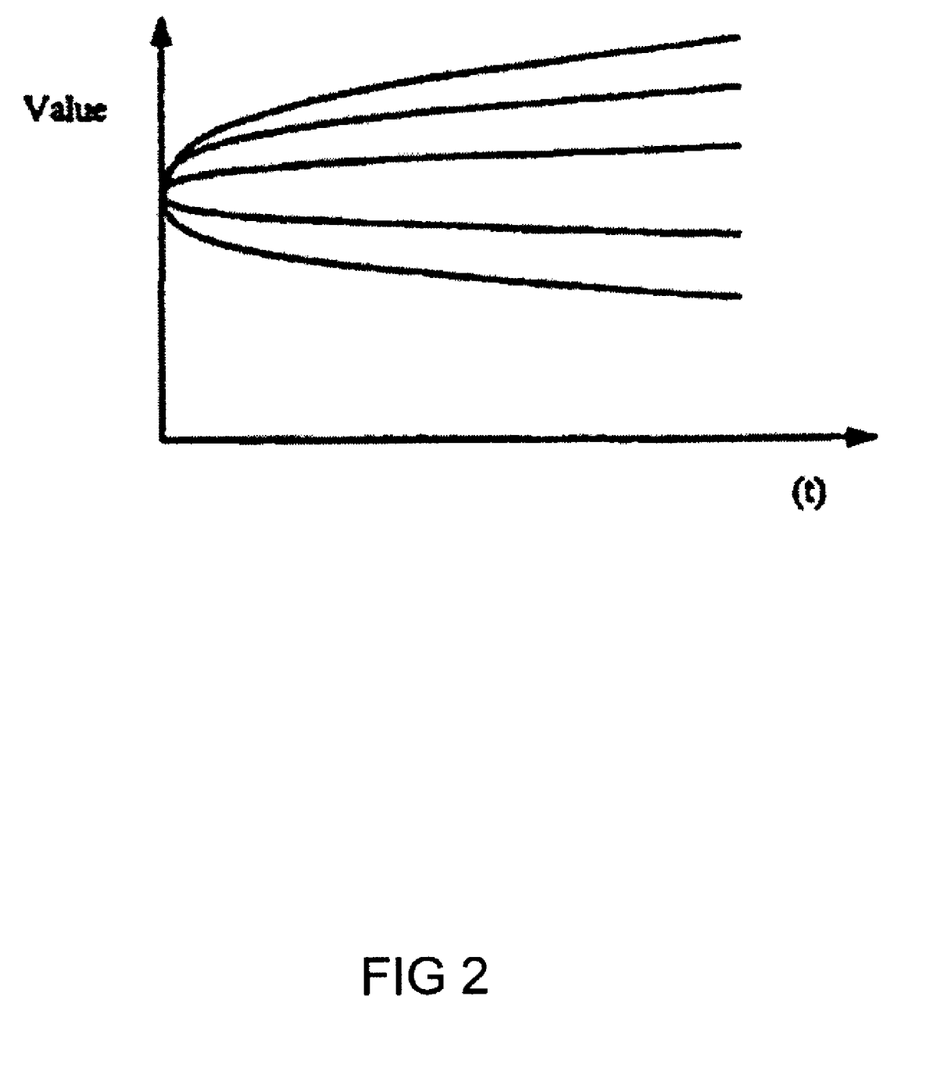
FIG. 2 is a diagram depicting a graph of a deal valuation function.
Figure 3:
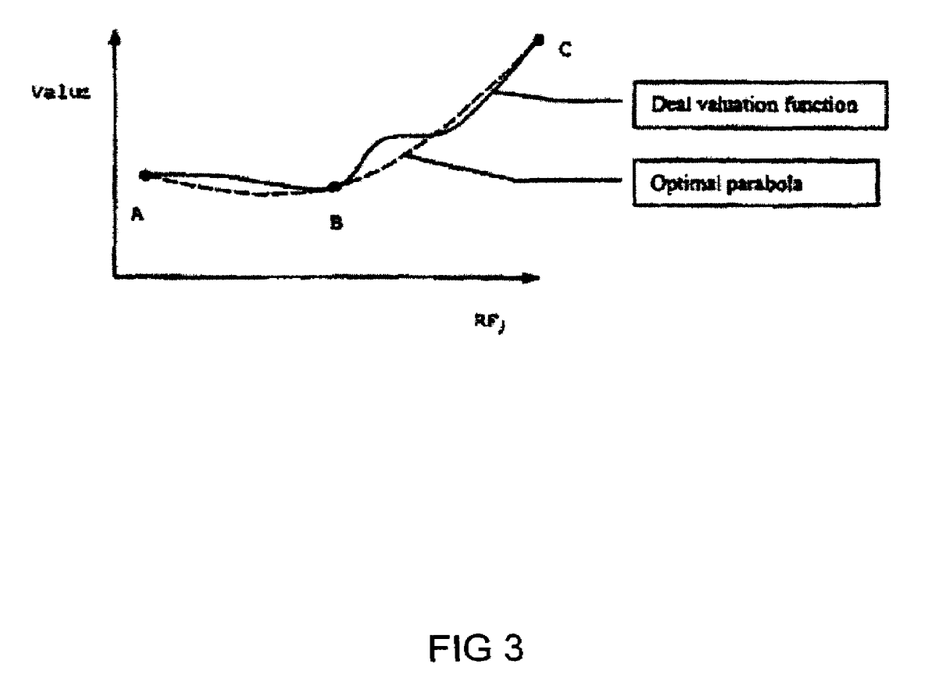
FIG. 3 is a diagram depicting a graph of a deal valuation function.

It will be appreciated that the method that forms the present invention can be implemented on a computer based machine. As such the elements represented in FIG. 1 correspond to computer system (a computer-based machine including computer hardware and software).

In this regard a computer system performing the method of the present invention, is used to calculate the upper-bound of the possible future values of a portfolio of financial instruments. The calculation can be equated to a maximum exposure of that portfolio and hence can be used by a financial institution to evaluate whether a particular portfolio is appropriate for a particular counterparty.

As a first step in the method, predetermined mathematical representations of the financial instruments to form the portfolio are called up from an electronic memory store and populated with data from a database to thereby define the nature of each of the respective financial instruments.

Hence, for each type of financial instrument to the portfolio there exists a electronic basic skeleton or template representation. Such a skeleton is matched to the financial instrument in question, and then populated with data from a data base, to define the financial instrument more precisely. As an example, there is a skeleton representation for certain foreign exchange related financial instruments. The representation will for example have parameters which store details of whether the instrument is a "call" or "put", whether it is bought or sold, a strike amount, an underlying amount, a trade date and an exercise date. Such data is populated into the skeleton function to define the nature of the instrument.

The defined representations of the financial instruments are termed "deal objects". The deal objects have three main functions:

The first function of each deal object is to value itself using its deal valuation function for a given scenario of market variables. The valuation function is an established mathematical function which is different for each deal type. The value of the function depends on the values of market variables represented on the risk factor objects and also the representation of the financial instrument contained in the deal object.

The second function of each deal object is to establish to which external or market factors the valuation function of that deal object is sensitive. For example, for a foreign exchange financial instrument, factors such as the USDollar/Sterling rate can have significant effects on their valuation. As such, the second function of each deal object is to identify which external factors (termed risk factors) are appropriate to the deal valuation function. In this connection, the future value of a financial instrument(or portfolio of instruments) will be affected by one or more inherently random market variables—i.e. the risk factors. Thus when making a future valuation of a particular instrument, one needs to take into account the effects of such underlying factors.

To this end, risk factor objects operate within the method to evaluate the effects of such external risk factors. The risk factor objects operate in a similar way to the deal objects, namely for each type of risk factor, such as asset prices or interest rates, there is an electronic skeleton or template in the form of a mathematical representation. These representations are populated with data from a database to define more precisely what that risk factor is and thereby form one or more risk factor models. The risk factor objects are hence a statistical description of the market variable in question, say UK interest rates, together with a particular state of that variable. The "state" of each risk factor is used throughout the method in order to represent different future market scenarios to the deal valuation functions.

The third function of each deal object is to approximate its valuation function with a parabolic function. The parabolic function for each deal object is determined using the deal valuation function and the relevant risk model or models, and is represented by the formula:—

$$U(\underline{x}(t),t) = a(t) + \Sigma b_i(t) \cdot x_i(t) + \Sigma c_{ij}(t) \cdot x_i(t) \cdot x_j(t)$$

Where:—
  $U(\underline{x}(t),t)$ is the parabolic approximation of the valuation function.
  $\underline{x}(t)$ is multivariate normal vector of risk factors.
  a, b, c are time-dependent constants.

In this regard, each deal object is able to select how its deal valuation function fits a parabola in the "optimal" way such that its behavior at the extremes and any internal nuances are captured. Fitting the "optimal fit" parabolic curve for a particular deal valuation involves establishing a limited number (e.g. three) or more coordinates through actual calculation, and then fitting the optimal curve to pass through those coordinates.

By way of a single-dimension simplified example, if we consider the possible future values of a particular deal valuation function ($d_i$) represented graphically by the following curves over time (t).

In this example if we consider this deal valuation function to be sensitive to a single risk factor ($RF_j$), say interest rates. Then, at a particular instant, the valuation of $d_i$ is found by the operation of $d_i$ ($RFj$) and may take the form:

As discussed, in order to plot each point on this deal valuation function would involve many thousands of test cases. Since this would significantly reduce the speed of operation of the method, rather than evaluate each point, the method makes an approximation of the valuation function by evaluating the deal valuation function at three or more values of the risk factor ($RF_i$) and then fitting the optimal parabola through these points, as shown by the dotted line passing through coordinates A, B and C.

Each deal object is able to select how many coordinates to take to make the optimal fit parabola and is further able to choose what form of parabola will fit in the most suitable way.

It should be borne in mind that the above example is highly simplified and that in practice the deal valuation functions and risk factor models will be multi-dimensional and highly complex, with each deal valuation function being sensitive to a plurality of such risk factor models.

In this connection, a more complete analysis of the fitting of the optimal parabola (or quadratic polynomials) is given below.

Fitting the Parabolic Approximation

The key to the method is that deals of different types are able to select the method used to construct their optimal parabolic function. This parabolic function approximates the valuation function as closely as possible particular at the extremes of the risk factor where the upper-bound is most likely to be situated.

Non-linear Functions

For non-linear products in the netted case, and all products which can cross the money in the non-netted case (when used without netting, the floor of the valuation function is used), the following technique is used to fit parabolic manifolds. As already discussed, it is assumed that each valuation function can be expressed in the form:

$V(\underline{x}(t),t)$ where $\underline{x}(t)$ is a multivariate normal distribution with zero mean or risk factors that are prices, the random variable used will be x(t) used by the lognormal diffusion model such that:

$$x(t) \approx \phi(0, \sigma\sqrt{t})$$

$$S(t) = \overline{S}(t) \cdot e^{x(t)}$$

$$\overline{S}(t) = S_0 e^{\mu \cdot t - 0.5\sigma^2 t}$$

For risk factors that are interest rates the random variable used will be x(t) used by the Hull-White mean reversion model such that:

$$x(t) \approx \Phi(0, \sqrt{(e^{2at}-1)/2a})$$

$$DF(t,T) = H(t,T) \cdot e^{J(t,T) \cdot x(t)}$$

$$J(t,T) = -\sigma \cdot e^{-at} \cdot B(t,T)$$

We seek to approximate each valuation function with a polynomial of the form:

$$U(\underline{x}, t) = a(t) + \sum_i b_i(t) \cdot x_i(t) + \sum_{i,j} c_{ij}(t) \cdot x_i(t) \cdot x_j(t)$$

The polynomial coefficients are generated so as to create a manifold that intersects the valuation function at the origin, and at the single dimensional upper and lower bounds of each risk factor. This can be regarded as a 'discretised' Taylor expansion which tends to the Taylor coefficients (where calculable) as $\sigma_i(t)$ tends to zero.

$$a(t) = V(0, t)$$

$$b_i(t) = \frac{(V(q_i, t) - V(-q_i, t))}{2 \cdot \sigma_i(t) \cdot Q_\alpha}$$

$$c_{ii}(t) = \frac{(V(q_i, t) + V(-q_i, t) - 2 \cdot V(0, t))}{2 \cdot (\sigma_i(t) \cdot Q_\alpha)^2}$$

Where:
  $q_i$ is a vector with the $i^{th}$ element set to $\sigma_i(t) \cdot Q_\alpha$ and all others zero
  $Q_\alpha$ is the normal quantile at the required level of confidence
  When second-order cross terms are required, they are given (for $i \neq j$) by:

$$c_{ij}(t) = \frac{(V(+q_i + q_j, t) + V(-q_i - q_j, t) - V(+q_i - q_j, t) - V(-q_i + q_j, t))}{2 \cdot \sigma_i(t) \cdot \sigma_j(t) \cdot Q_\alpha^2}$$

Where more than three points are evaluated for each risk factor, the process of quadratic least squares is used to fix the quadratic coefficients.

Linear Functions

For linear valuation functions in the netted case, such as forwards and vanilla interest rate swaps, it is possible to generate the coefficients of the parabolic manifold directly from the valuation functions themselves. Examples of direct derivation of coefficients are given below for a Forward Rate Agreement, and Equity Forward.

The Forward Rate Agreement (FRA) can be written as a parabolic surface of two risk factors with coefficients:

$a = P \cdot \overline{X}(t) \{H(t,T) - K \cdot H(t,T+m)\}$ $b_1 = P \cdot \overline{X}(t) \{H(t,T) - K \cdot H(t,T+m)\}$ $c_{11} = P \cdot \overline{X}(t) \cdot \{H(t,T) - K \cdot H(t,T+m)\}/2$ $b_2 = P \cdot \overline{X}(t) \cdot (H(t,T) J(t,T) - K \cdot H(t,T+m) J(t,T+m))$ $c_{22} = P \cdot \overline{X}(t) \cdot (H(t,T) J^2(t,T) - K \cdot H(t,T+m) J^2(t,T+m))/2$ $c_{12} = P \cdot \overline{X}(t) \cdot (H(t,T) J(t,T) - K \cdot H(t,T+m) J(t,T+m))$ $K = (1 + (m/360) \cdot FRA)$ where $x_1$ is the risk factor for the exchange rate to base currency, and $x_2$ is the risk factor for the FRA interest rate.

Similarly, the Equity Forward can be expressed in terms of the risk factors for equity price ($x_1$) deal exchange rate ($x_2$) and deal interest rate ($x_3$) using the following coefficients:

$a = \overline{S}(t) \cdot e^{-D(T-t)} - S\_FWD \cdot H(t,T) \cdot \overline{X}(t)$ $b_1 = \overline{S}(t) \cdot e^{-D(T-t)}$ $b_2 = -S\_FWD \cdot H(t,T) \cdot \overline{X}(t)$ $b_3 = -S\_FWD \cdot H(t,T) \cdot \overline{X}(t) \cdot J(t,T)$ $c_{11} = \overline{S}(t) \cdot e^{-D(T-t)}/2$ $c_{22} = -S\_FWD \cdot H(t,T) \cdot \overline{X}(t)/2$ $c_{33} = -S\_FWD \cdot H(t,T) \cdot \overline{X}(t) \cdot J^2(t,T)/2$ $c_{23} = S\_FWD \cdot H(t,T) \cdot \overline{X}(t) \cdot J(t,T)$ Variations Some deal functions work well with a hybrid of the discretised and Taylor methods. For example, the value of a European equity call option is given by:

$V(t) = X(t)[S_d(t) \cdot e^{-D(T-t)} \cdot N(d_1) - K \cdot DF_d(t,T) \cdot N(d_2)]$ The value of the option in the deal's domestic currency is the expression within the square brackets which becomes increasingly non-linear as deal approaches maturity. However the exchange rate which converts the function back to base currency can be modelled with a Taylor expansion:

$X(t) = a + bx(t) + cx^2(t)$ $a = X(0) \cdot e^{(\mu_s - \sigma_s^2/2)t}$ $b = X(0) \cdot e^{(\mu_s - \sigma_s^2/2)t}$ $c = X(0) \cdot e^{(\mu_s - \sigma_s^2/2)t}/2$ The non-linearity of the option equation in base currency can thus be modelled by taking the product of the two expansions resulting in a closer fit polynomial.

This third operation of each deal object therefore builds parabolic functions which represent valuations of each deal function taking into account the risk factors to which that deal function is sensitive.

Upper-bound of the Parabolic Manifold

In order to evaluate the upper-bound of the portfolio the method uses the upper bound of the parabolic manifold of the portfolio as an approximation. The portfolio parabolic manifold is built under a calculation object, which in essence involves adding the parabolic functions of each of the deal function valuations built in the deal objects discussed above.

Hence if there are 3 deals, the parabolic functions of these are added to arrive at a total. In practice in building the parabolic manifold, the coefficients of corresponding terms are added such that for each deal valuation function $d_i$

| $d_1$ | $V_1 = a_1 + b_1 \cdot x + c_1 \cdot x^2$ |
| $d_2$ | $V_2 = a_2 + b_2 \cdot x + c_2 \cdot x^2$ |
| $d_1$ | $V_3 = a_3 + b_3 \cdot x + c_3 \cdot x^2$ |
| SUM | $V_3 = A + B \cdot x + C \cdot x^2$ |

Where $A = a_1 + a_2 + a_3$
  $B = b_1 + b_2 + b_3$
  $C = c_1 + c_2 + c_3$

This parabolic manifold will relate to a highly complex surface. The upper bound of this manifold is then evaluated by certain mathematical methods, such as aggregation, decomposition of the covariance matrix, transformation onto orthogonal variables, the application of PCA (Principal Component Analysis) on weighted factors, the transforming away of cross terms, and the calculation of distribution moments and percentiles for the approximation. These methods are set out below in greater detail in the context of the process of establishing an upper-bound for the parabolic manifold at a given point in time.

Step 1: Portfolio Parabolic Manifold

As already discussed, the portfolio is approximated by a parabolic manifold of normal variates with constants $A(t)$, $B_i(t)$ and $C_{ij}(t)$ of the form:

$$\Pi(\underline{x}, t) = A(t) + \sum_i B_i(t) \cdot x_i(t) + \sum_{i,j} C_{ij}(t) \cdot x_i(t) \cdot x_j(t) \quad (0.1)$$

$$A(t) = \sum_k a^k(t)$$

$$B_i(t) = \sum_k b_i^k(t)$$

$$C_{ij}(t) = \sum_k c_{ij}^k(t)$$

Step 2: Decompose the Covariance Matrix

In preparation for transforming onto an orthogonal set of risk factors, we find the 'square root' (Cholesky factorisation) of the covariance matrix COV for the stochastic variables $x_i$. This yields a matrix D such that:

$$COV = D \cdot D^T$$

Note that the Cholesky factorisation of a covariance matrix can be derived from the decomposition of the correlation matrix as follows. Let the matrix $A=[a_{ij}]$ be the decomposed correlation matrix such that:

$$AA^T = [\rho_{ij}]$$

Then the decomposition of the covariance matrix is given by $[\sigma_i a_{ij}]$ since:

$$[a_{ij}\sigma_i][a_{ij}\sigma_i]^T = diag(\underline{\sigma})A \cdot [diag(\underline{\sigma})A]^T$$
$$= diag(\underline{\sigma})A \cdot A^T diag(\underline{\sigma})^T$$
$$= diag(\underline{\sigma})[\rho_{ij}]diag(\underline{\sigma})$$
$$= COV$$

Step 3: Transform Onto Orthogonal Variables

We make the transformation onto the orthogonal vector, $\underline{y}$, defined by:

$$\underline{y}(t) = D^{-1} \cdot \underline{x}(t) \text{ or } \underline{x}(t) = D \cdot \underline{y}(t)$$

Then $\underline{y}(t)$ is multivariate normal with zero mean and unit covariance matrix. We may now write the portfolio approximation as:

$$\Pi(\underline{y}, t) = A(t) + \tilde{B}^T \underline{y}(t) + \underline{y}^T(t) \cdot \tilde{C} \cdot \underline{y}(t)$$

where:

$$\tilde{B} = D^T \cdot \underline{B}(t)$$

$$\tilde{C} = D^T \cdot C(t) \cdot D$$

$$\underline{y}(t) \sim \phi(0, I)$$

Step 4: Perform PCA on Weighted Factors

At this stage the dimensionality of the calculation may be quite high—particularly if the portfolio contains a large number of equity or commodity derivatives. As long as these outlying assets have been correlated reasonably to more dominant risk factors (such as stock indices, the price of their trading currency etc), then movements in these variables is encapsulated in the dominant terms of the new orthogonal factors, $\underline{y}$.

To establish the principal components of the $\underline{y}$ factors, we take the absolute size of each first order term as a measure of its significance to the portfolio value at that timestep.

Suppose $$\tilde{B} = \begin{pmatrix} \tilde{b}_1 \\ \tilde{b}_2 \\ \ldots \\ \tilde{b}_n \end{pmatrix}$$

then we order $\tilde{b}_i$ such that $|\tilde{b}_1| \leq |\tilde{b}_2| \leq \ldots \leq |\tilde{b}_n|$ In parallel with this process, for each switch in position of the elements of $\underline{B}$, we interchange both rows and columns of C. Thus if we switch elements $\tilde{b}_i$ and $\tilde{b}_j$ we also interchange $i^{th}$ and $j^{th}$ column and row of C. (This maintains consistency between the implicit permutation applied to the factor vector).

The elements of the orthogonal vector y are now in principal component order, thus in order to reduce the dimensionality of the calculation the first k elements may be used and the others set to zero. Empirically, the calculation functions satisfactorily with the number of principal components set between 10 and 20.

Step 5: Transform Away the Cross-Terms

The elements of the C matrix still contain non-diagonal elements, so we make one last transformation to simplify the representation. Note that after PCA has been applied, this step is performed on a much reduced matrix, which greatly increases speed of the $o(n^3)$ diagonalisation algorithm. We determine an orthogonal matrix E, and a diagonal matrix $\hat{C}(t)$ such that $$\hat{C}(t) = E^T \cdot \tilde{C}(t) \cdot E \text{ and } E \cdot E^T = I$$

Then make the transformation onto the vector, $\underline{z}$, defined by:

$$\underline{z}(t) = E^T \cdot \underline{y}(t) \text{ or } \underline{y}(t) = E \cdot \underline{z}(t)$$

Note that since $E \cdot E^T = I$, the vector $\underline{z}(t)$ is still (a) orthogonal and (b) multivariate normal with zero mean and unit covariance matrix. We may now write the portfolio approximation as:

$$\Pi(\underline{z}(t), t) = A(t) + \hat{B}(t)^T \underline{z}(t) + \underline{z}^T(t) \cdot \hat{C}(t) \cdot \underline{z}(t)$$

where:

$$\hat{B} = E^T \cdot \tilde{B}(t) \quad \hat{C} = E^T \cdot \tilde{C}(t) \cdot E \quad \underline{z}(t) \sim \phi(0, I)$$

We have thus diagonalised both the covariance matrix and the portfolio 'Gamma' matrix C (see also Rouvinez, 1997).

Step 6: Distribution Moments

We have transformed the representation of the portfolio valuation function into a quadratic form of independent unit normal variables. Leaving aside the constant term, $A(t)$, which will be added to the percentile in the last stage of the calculation, we define the variable X as a quadratic form in normal variables:

$$X = b'y + y'Cy$$

A standard application of moment generating functions (see Johnson & Kotz, 1995) yields the following expressions for the moments (or cumulants) of X:

Mean: $\mu = E(X) = tr(C)$

Variance: $\sigma^2 = E((X-\mu)^2) = 2tr(C^2) + b'b$

Skew: $\varepsilon = \dfrac{E((X-\mu)^3)}{\sigma^3} = \dfrac{8tr(C^3) + 6b'Cb}{\sigma^3}$ Kurtosis: $\kappa = \dfrac{E((X-\mu)^4)}{\sigma^4} - 3 = \dfrac{48tr(C^4) + 48b'C^2b}{\sigma^4}$ More generally, the $r^{th}$ cumulant is given by:

$$\kappa_r = \frac{E((X-\mu)^r)}{\sigma^r} = \frac{2^{(r-1)}(r-1)!tr(C)^r + r!2^{(r-3)}b'C^{(r-2)}b}{\sigma^r}$$

Although these expressions are valid for quadratic forms containing non-diagonal elements in the C matrix, the removal of off-diagonal elements greatly speeds up the calculation of moments because (a) the trace (tr(C)) of a diagonal matrix is just the sum of the diagonal elements and (b) multiplication of diagonal matrices is an o(n) rather than an o(n³) operation.

Step 7: Percentiles for the Approximation

From the previous step, the portfolio approximation can be written as:

$$\overline{\Pi}(t) = A(t) + X(t)$$

Where X(t) is a quadratic form of normal variables where all the cumulants are known. The Cornish Fisher moment correction technique is used to estimate the percentile (i.e. the exposure number) of this distribution. The q-percentile of a compound distribution of X involving four moments is given by:

$$X_\alpha = \mu + \sigma \left\{ q + \frac{1}{6}(q^2 - 1)\varepsilon + \frac{1}{24}(q^3 - 3q)\kappa - \frac{1}{36}(2q^3 - 5q)\varepsilon^2 + \ldots \right\}$$

where:
q is the percentile of the unit normal distribution.
$\mu, \sigma, \varepsilon, \kappa$ are the mean, standard deviation, skew and kurtosis of X The q-percentile for a distribution using the first six moments is given by:

$$X_\alpha = \mu + \sigma \begin{bmatrix} q + \frac{1}{6}(q^2-1)\kappa_3 + \frac{1}{24}(q^3-3q)\kappa_4 - \frac{1}{36}(2q^3-5q)\kappa_3^2 + \\ \frac{1}{120}(q^4-6q^2+3)\kappa_3 - \frac{1}{24}(q^4-5q^2+2)\kappa_3\kappa_4 + \\ \frac{1}{324}(12q^4-53q^2+17)\kappa_3^3 + \frac{1}{720}(q^5-10q^3+15q)\kappa_6 - \\ \frac{1}{180}(2q^5-17q^3+21q)\kappa_3\kappa_5 - \frac{1}{384}(3q^5-24q^3+29q) \\ \kappa_4^2 + \frac{1}{288}(14q^5-103q^3+107q)\kappa_3^2\kappa_4 - \\ \frac{1}{7776}(252q^5-1688q^3+1511q)\kappa_3^4 + \ldots \end{bmatrix}$$

The exposure of the portfolio is finally given by:

$$\overline{\Pi}^+(t) = A(t) + X_\alpha(t)$$

Note that this method functions for both netted and non-netted aggregations since these are determined by the first stage of valuation function approximation.

In a final operation, undertaken by the Portfolio Model object, the enhanced parabolic manifold, formed in the calculation object, is operated, i.e. it provides values for the deal valuation functions taking into account the controlled perturbations of the risk factors in the risk factor objects.

The present invention is not to be limited in scope by the specific embodiment described herein. Indeed, various modifications of the invention will become apparent to those skilled in the art from the foregoing description and accompanying figure. Such modifications are intended to fall within the scope of the appended claims.

The invention claimed is:

1. A method implemented on a computer system for evaluating the credit exposure of a portfolio of one or more financial instruments, the method comprising:
    establishing a deal object for each financial instrument by the computer system, the deal object comprising a representation of said financial instrument and a valuation function for representing how the value of the financial instrument is related to underlying market variables;
    establishing one or more risk factor models by the computer system, each risk factor model representing an underlying financial market variable which may affect the value of one or more of said financial instruments;
    establishing a deal parabolic function for representing each deal object valuation function by the computer system, by operation of each deal object valuation function on each risk factor model to which it is sensitive; and
    summing the coefficients of each said deal parabolic function established at a same instant from the one or more deal objects represented in the portfolio in order to build a portfolio parabolic function which approximates the overall portfolio value for that instant;
    wherein establishing each said deal parabolic function involves evaluating a plurality of coordinates calculated from said deal object valuation function and then applying a parabolic curve, surface or multi-dimensional surface to fit said coordinates, the parabolic curve or surface then representing that deal object valuation function.

2. A method according to claim 1, wherein three or more coordinates are calculated.

3. A method according to claim 1 wherein each deal object valuation function is established using a deal object, each deal object operating to select an appropriate skeleton or template representation from a store of such representations of financial instruments, and to populate the skeleton or template with data which will define the nature of the financial instrument.

4. A method according to claim 1, wherein each deal object further operates to identify to which risk factor models the valuation function of that deal object is sensitive.

5. A method according claim 1, wherein each deal object further operates to value the deal represented therein in relation to the risk factor models that have been identified as being appropriate to the valuation function of that deal object.

6. A method according claim 1, wherein the deal object operates to apply an "optimal fit" parabolic curve to the coordinates evaluated from the deal object valuation function, the optimal fit curve being chosen on the basis that it most readily passes through the coordinates plotted with minimum deflection between coordinates.

7. A method according to claim 6 wherein when more than three coordinates per risk factor model are evaluated, the technique of quadratic least squares is employed to derive the parabola coefficients.

8. A method according to claim 1, wherein the coordinates to which the parabola is to be applied are chosen from each of the limits of the deal object valuation function (defined by the extremes of the relevant risk factors) and at its central region.

9. A method according to claim 1, wherein templates or skeleton representations for each said deal object are stored in a suitable store.

10. A method according claim 1, wherein each risk factor model is established using a risk factor object, each risk factor object operating to select an appropriate skeleton or template representation from a store of such representations of risk factors and to populate the skeleton or template with data which will define the nature of the risk factor model.

11. A method according to claim 1, wherein the method further comprises compiling a database or store of financial and market data.

12. A method according to claim 1, further comprising the use of techniques of linear algebra and quadratic forms to evaluate the statistical upper-bound of the portfolio parabolic function, and hence, an approximation for the credit exposure of the portfolio.

13. A method according to claim 12, wherein said techniques comprise one or more of aggregation, decomposition of the covariance matrix, transformation onto orthogonal variables, the application of PCA (Principal Component Analysis) on weighted factors, the transforming away of cross terms, and the calculation of distribution moments and percentiles for the approximation.

14. A computer readable storage medium having stored thereon computer-implemented instructions for performing a method comprising:
   establishing a deal object for each financial instrument by a computer system, the deal object comprising a representation of said financial instrument and a valuation function for representing how the value of the financial instrument is related to underlying market variables;
   establishing one or more risk factor models by the computer system, each risk factor model representing an underlying financial market variable which may affect the value of one or more of said financial instruments;
   establishing a deal parabolic function for representing each deal object valuation function in the computer system, by operation of each deal object valuation function on each risk factor model to which it is sensitive; and
   summing the coefficients of each said deal parabolic function established at a same instant from the one or more deal objects represented in the portfolio in order to build a portfolio parabolic function which approximates the overall portfolio value for that instant;
   wherein establishing each said deal parabolic function involves evaluating a plurality of coordinates calculated from said deal object valuation function and then applying a parabolic curve, surface or multi-dimensional surface (manifold) to fit said coordinates, the parabolic curve or surface then representing that deal object valuation function.

15. The computer readable storage medium of claim 14, wherein evaluating a plurality of coordinates comprises evaluating at least three coordinates.

16. The computer readable storage medium of claim 14, wherein each deal object valuation function is established using a deal object, each deal object operating to select an appropriate skeleton or template representation from a store of such representations of financial instruments, and to populate the skeleton or template with data which will define the nature of the financial instrument.

17. A system for evaluating the exposure of a portfolio of one or more financial instruments, the system comprising:
   a computer system;
   a computer memory communicatively coupled to a computer processor, the computer memory comprising instructions when executed by the computer processor performs the following:
      establishing a deal object for each financial instrument, the deal object comprising a representation of said financial instrument and a valuation function for representing how the value of the financial instrument is related to underlying market variables;
      establishing one or more risk factor models, each risk factor model representing an underlying financial market risk factor which may affect the value of one or more of said deal objects;
      establishing a deal parabolic function for each deal object, comprising means for operation of the deal object valuation function on each risk factor model to which it is sensitive; and
   summing each said deal parabolic function established at a same instant from the deal objects represented in the portfolio in order to build an overall portfolio value for that instant;
   wherein establishing each said deal parabolic function comprises making an approximation of each deal object valuation function, involving the evaluation of a plurality of coordinates calculated from said deal object valuation function and then applying a parabolic curve, surface, hyper surface.

18. A system according to claim 17, wherein the evaluation of a plurality of coordinates comprises evaluating at least three coordinates.

* * * * *

UNITED STATES PATENT AND TRADEMARK OFFICE
CERTIFICATE OF CORRECTION

PATENT NO. : 7,620,581 B2 Page 1 of 1
APPLICATION NO. : 10/492903
DATED : November 17, 2009
INVENTOR(S) : Lea et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Twenty-sixth Day of October, 2010

David J. Kappos
*Director of the United States Patent and Trademark Office*